July 23, 1963 H. BUNK 3,098,292
METHOD AND APPARATUS FOR FORMING GENERALLY
CYLINDRICAL PARTS FROM THICK METAL STOCK
Filed Sept. 2, 1959 2 Sheets-Sheet 1

INVENTOR.
HUGO BUNK
BY
ATTORNEYS

INVENTOR.
HUGO BUNK
BY

ATTORNEYS

United States Patent Office 3,098,292
Patented July 23, 1963

3,098,292
METHOD AND APPARATUS FOR FORMING GENERALLY CYLINDRICAL PARTS FROM THICK METAL STOCK
Hugo Bunk, Sylvania, Ohio, assignor to National Lead Company, New York, N.Y., a corporation of New Jersey
Filed Sept. 2, 1959, Ser. No. 837,627
3 Claims. (Cl. 29—412)

This invention relates to a method and apparatus for forming generally cylindrical parts from thick metal or other deformable stock, and has for its primary object to provide such a method and apparatus which will result in a part having superior physical characteristics.

In known methods of blanking out discs or similar pieces of metal stock, an apparatus is used which comprises a punch carried by the movable slide of a press and cooperating with a stationary die. In every instance with which I am familiar, the punch is made smaller in diameter than the die opening, and enters the die opening at the bottom end of its stroke. The die opening is tapered slightly from the side towards the punch so that the blanked part will drop out satisfactorily without sticking in the die opening.

A principal object of the present invention is to provide a method and apparatus for forming parts of thick sheet metal or other deformable material which have an extremely smooth, untapered periphery that is accurate in diameter to .001″ or less, and in which the metal has a more dense structure than is obtainable with present methods.

Still another object of the present invention is to provide a method and apapratus for forming metal parts in which the part produced is evenly crowned so that the metal contained therein is evenly distributed throughout the entire mass.

Other objects and advantages of the invention will become apparent from the following specification, reference being had to the accompanying drawings, in which.

Figure 1:
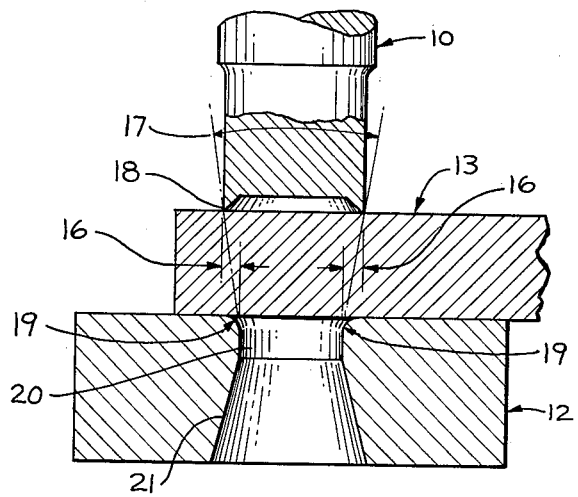
FIG. 1 is a diagrammatic vertical sectional view of a die set constructed in accordance with the present invention, immediately prior to the first operation thereof.

The present invention, in its method aspects, comprises a method for forming generally cylindrical parts from thick sheet stock in a press which includes the steps of initially forming a part to a semi-finished shape in a die that has a cylindrical throat equal in diameter to the desired diameter of the finished part, advancing the stock over the semi-finished part, and completing the formation of the semi-finished part by forcing the same through the die through the medium of the next succeeding part which remains in the die and becomes the semi-finished part for the next press stroke.

In its apparatus aspects the invention comprises generally the combination of a die set in which the die has an opening larger than the finished diameter of the part to be formed, a cylindrical throat area of substantial axial extent with a diameter equal to the finished diameter, and a lower relieved area. The punch which cooperates with the die has an effective diameter larger than the diameter of the throat area above mentioned, and the punch may be formed with a peripheral cutting edge to assure a clean fracture of the metal piece as it is severed from the stock.

In the drawings, a die set constructed in accordance with the present invention and capable of carrying out my new method is shown in various stages of operation in connection with a sheet of metal. The present invention is particularly useful where a cylindrical part to be produced must be symmetrical about a central vertical axis and must have a polished exterior finish. The metal structure of the parts produced has been found to be more dense than can be obtained by conventional punching methods which leave the periphery of the blanked part torn, irregular, and defaced.

The die set includes a reciprocable punch 10, which may be fixed to the slide of a press in any convenient manner and which may cooperate with a conventional stripper plate (not shown). A stationary die element 12 is used which is fixed to the press bed (not shown). The stock to be used in the formation of the parts is indicated at 13.

In conventional punching appartus the punch is always made smaller in diameter than the opening in the die, and the stroke of the press is such that at bottom dead center the punch enters the die opening with a predetermined clearance between its periphery and the inside of the die opening. In contrast, the punch 10 of the present invention is made larger in diameter than the minimum die opening, the difference in diameteral dimension being indicated at 16. The shear angle between the punch and die is thus reversed in direction over that usually employed. The shear angle is indicated at 17 in the drawings and may, of course, be varied in accordance with the tonnage available in the press, within known limits. The "shear angle" may be defined as the angle included between two lines drawn through the stock in the central vertical plane of the punch and between the outer edges of the punch 10 and the adjacent upper edges of the throat 20 of the die, when the punch is in its lowermost position against the stock but prior to any piercing of the stock. It will be seen that in the case of the present invention the apex of this angle is well below the die, while in normal piercing die sets the apex of the angle lies above the die somewhere within the confines of the punch.

The punch 10 is ground to form a sharp peripheral cutting edge 18 in the preferred form, and the central portion of the punch acts as a forming member on the top of the stock so that a smooth flat surface will result.

The die member 12 includes an axially extensive cylindrical throat 20 having an entering radius 19 and a relieved or flared portion 21 below the cylindrical throat. The sides of the piece formed by the present invention are shaped by the cylindrical, untapered, throat 20 of the die so that the finished piece has a very smooth periphery of accurate diamensions, the diameter being determined by the diameter of the throat area 20. This dimension can readily be held to ±.001 on the finished piece.

Figure 2:
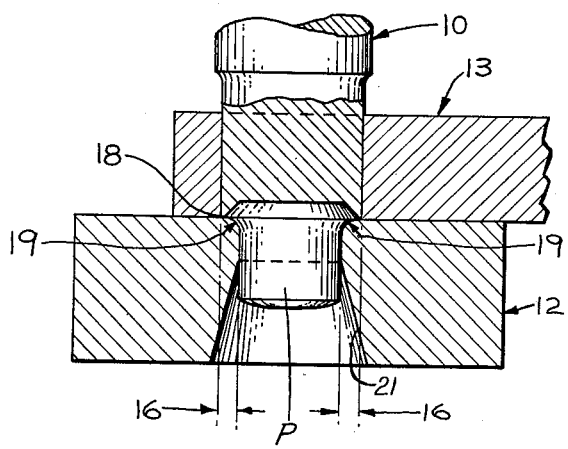
FIG. 2 is a similar view showing the punch at the limit of its travel.

The method of the present invention comprises partially forming a part by the cooperative action of the punch and die on the stock, and the completion of the part by the cooperative action of the next succeeding part and of the die. As shown in FIG. 2, the initial stroke of the press causes the punch 10 to sever a part P from the sheet of stock 13. This initial stroke forces the face or bottom of the part at least through the cylindrical throat 20 of the die, and leaves a crowned upper part with the impression of the under face of the punch extending above the plane of the die.

Figure 3:
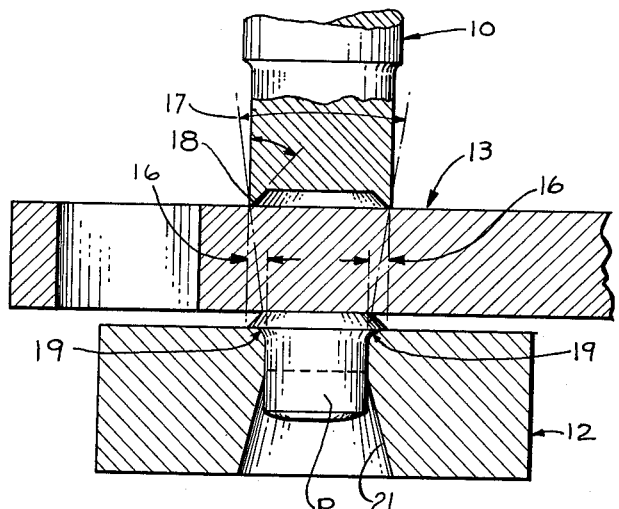
FIG. 3 is a similar view showing the punch withdrawn, and the stock advanced and ready for the next stroke of the punch.

The punch 10 is then withdrawn and the stock advanced, the parts being then as shown in FIG. 3. It will be noted that the stock strip 13 has advanced over the crown of the semi-finished preceding piece, and that the distance of advancement is much less than the accepted practice in which a minimum scrap frame would require a web between holes well in excess of the thickness of the stock.

Figure 4:
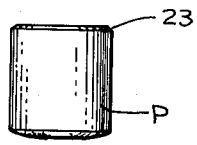
FIG. 4 is a side elevational view of a typical finished part.
Figure 5:
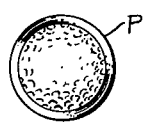
FIG. 5 is a plan view thereof.

The following stroke of the punch 10 against the stock forces the first semi-finished part P completely through the die 20 and seats the next part in its place in the die. The force of this stroke is imposed on the crown of the first part through the flat under surface of the stock so that there is no radial distortion which would cause more metal to gather in one area than in another. The force of the punch thus completes an even and uniform doming of the underside of the first part P as indicated in FIGS. 4 and 5. A beveled edge 23, caused by the angular cutting edge 18 appears on the finished part but in greatly reduced magnitude.

Since there is no contact between the punch and die, the life of these parts is greatly extended, and the accuracy of die alignment is not so critical as in the conventional case where the punch must enter the die with a uniform peripheral clearance which is critical to the satisfactory operation of the die set.

While the invention has been disclosed in conjunction with a specific form and disposition of the parts, it should be expressly understood that various modifications and changes may be made therein without departing from the spirit and scope of the appended claims.

I claim:

1. Apparatus for producing a cylindrical article from thick metal sheet stock said article having a predetermined, uniform diameter throughout its length, said apparatus comprising: a die member having a generally planar stock-engaging die face directed toward a first surface of said stock and having a generally cylindrical throat spaced inwardly from said die face, said throat having a diameter susbtantially equal to said predetermined diameter of said article for forming the finished cylindrical configuration of said article, said die face having a flared entry opening in direct communication with said throat for guiding a stock part from said sheet stock into said throat, said entry opening having a diameter at said die face greater than said throat diameter, a circular punch having a peripheral cutting edge for contacting a second surface of said sheet stock opposite said first surface and capable of severing said stock part therefrom, said punch being mounted for movement toward and away from a retracted position in which sheet stock can be fed parallel to said die face between said punch and said die member and a closed position in which said punch engages said die face, said peripheral cutting edge of said circular punch having a diameter susbtantially equal to said entry opening diameter at said die face, said punch having a recessed surface above the plane of said cutting edge, said punch being aligned with said cylindrical throat to cause said peripheral cutting edge to engage said die face concentrically with said entry opening and said throat when said punch is in the closed position, whereby said punch can move against said sheet stock to force a previously severed, semi-finished article through said die member by forcing a first portion of said stock part adjacent said first surface of said sheet stock in contact with said semi-finished article through said entry opening into said throat and a second portion of said stock part adjacent said second surface toward said opening and projecting above the plane of said die face.

2. Apparatus according to claim 1 wherein the length of said throat is less than the thickness of said sheet stock.

3. A method of producing a plurality of generally cylindrical articles from deformable sheet stock, said articles being of a uniform, predetermined diameter throughout their lengths, said method comprising: supporting the sheet stock parallel to a planar die face, severing a first cylindrical part having a diameter greater than the predetermined diameter from said sheet stock by moving a circular cutting edge having a diameter greater than said predetermined diameter through said sheet stock and toward the die face, simultaneously reducing the diameter of a first portion of said part remote from said sheet stock and said cutting edge to said predetermined diameter by forcing said first portion through a flared opening at the die face and directly into a cylindrical restriction having a diameter substantially equal to said predetermined diameter, while leaving a second portion of said first part toward said cutting edge projecting out of the opening and above the die face, moving said sheet stock parallel to the die face, severing a second cylindrical part from said sheet stock near a cavity left by said first part by moving the circular cutting edge through said sheet stock and into contact with the die face, at the same time causing a first portion of said second part to engage the second portion of said first part to push the remainder of said first part completely through said restriction, and reducing the diameter of the first portion of said second part by forcing the first portion of said second part into the cylindrical restriction.

References Cited in the file of this patent

UNITED STATES PATENTS

| | | |
|---|---|---|
| 2,275,438 | Hothersall | Mar. 10, 1942 |
| 2,404,793 | Dickerman | July 30, 1946 |
| 2,419,862 | Wales | Apr. 29, 1947 |
| 2,473,371 | Heath et al. | June 14, 1949 |
| 2,786,267 | Chappuis | Mar. 26, 1957 |
| 2,879,887 | Hawtin | Mar. 31, 1959 |
| 2,907,454 | Sejournet | Oct. 6, 1959 |
| 2,953,247 | Walter et al. | Sept. 30, 1960 |

FOREIGN PATENTS

| | | |
|---|---|---|
| 23,939 | Great Britain | 1912 |
| 336,803 | Great Britain | Oct. 23, 1930 |
| 653,195 | Great Britain | May 9, 1951 |
| 895,350 | France | Apr. 3, 1944 |